Oct. 15, 1929.　　E. W. SCHELLENTRAGER　　1,731,271
BIN GATE OPERATING CYLINDER
Filed Dec. 7, 1925　　4 Sheets-Sheet 3

Oct. 15, 1929.  E. W. SCHELLENTRAGER  1,731,271
BIN GATE OPERATING CYLINDER
Filed Dec. 7, 1925  4 Sheets-Sheet 4

Inventor
Eugene W. Schellentrager
By Brockett & Hyde
Attorneys.

Patented Oct. 15, 1929

1,731,271

UNITED STATES PATENT OFFICE

EUGENE W. SCHELLENTRAGER, OF CLEVELAND, OHIO, ASSIGNOR TO THE ATLAS BOLT & SCREW COMPANY, OF CLEVELAND, OHIO, A CORPORATION OF OHIO

BIN-GATE-OPERATING CYLINDER

Application filed December 7, 1925. Serial No. 73,723.

This invention relates to apparatus for handling and conveying granular materials, such as ore and other ingredients which enter into charges for blast furnaces or the like.

This apparatus usually includes suitable stationary bins for the various ingredients arranged along the side of a conveyor such as a car or other vehicle provided with a suitable container for receiving the various materials and also provided with a bin gate handling mechanism adapted to manipulate and control the opening and closing of the bin gates when the conveyor is in place in front of one of the bins. In these arrangements heretofore constructed, there is danger of the operator of the car, or vehicle, moving from one bin to the other while the bin gates are open resulting in damage to the bin gate and a loss of materials. The specific mechanism on the conveyor or car for handling the bin gates has also been of a character such that it was expensive to manufacture and could not be produced at a suitable figure which would interest the user. Another difficulty arising from the constructions heretofore employed resided in the fact that no means was provided for limiting the downward movement of the piston, where such devices were used, to prevent the shock incident to the lowering of the gate in place and resulting in great damage to the apparatus.

The present invention, therefore, contemplates in an apparatus of this type a suitable interlock between the conveyor control and the bin gate operating mechanism whereby when a gate is open, the operator is unable to move his conveyor or car until the bin gate is properly closed.

Invention also resides in the structure employed for the bin gate handling mechanism whereby it is efficient in operation and simple in construction and lends itself readily to production at reasonable cost.

Another feature of the invention is the provision of a suitable cushioning means applied in conjunction with the cylinder and piston door handling mechanism, so that the closing stroke of the piston is cushioned and danger to the mechanism is avoided.

Figure 1:
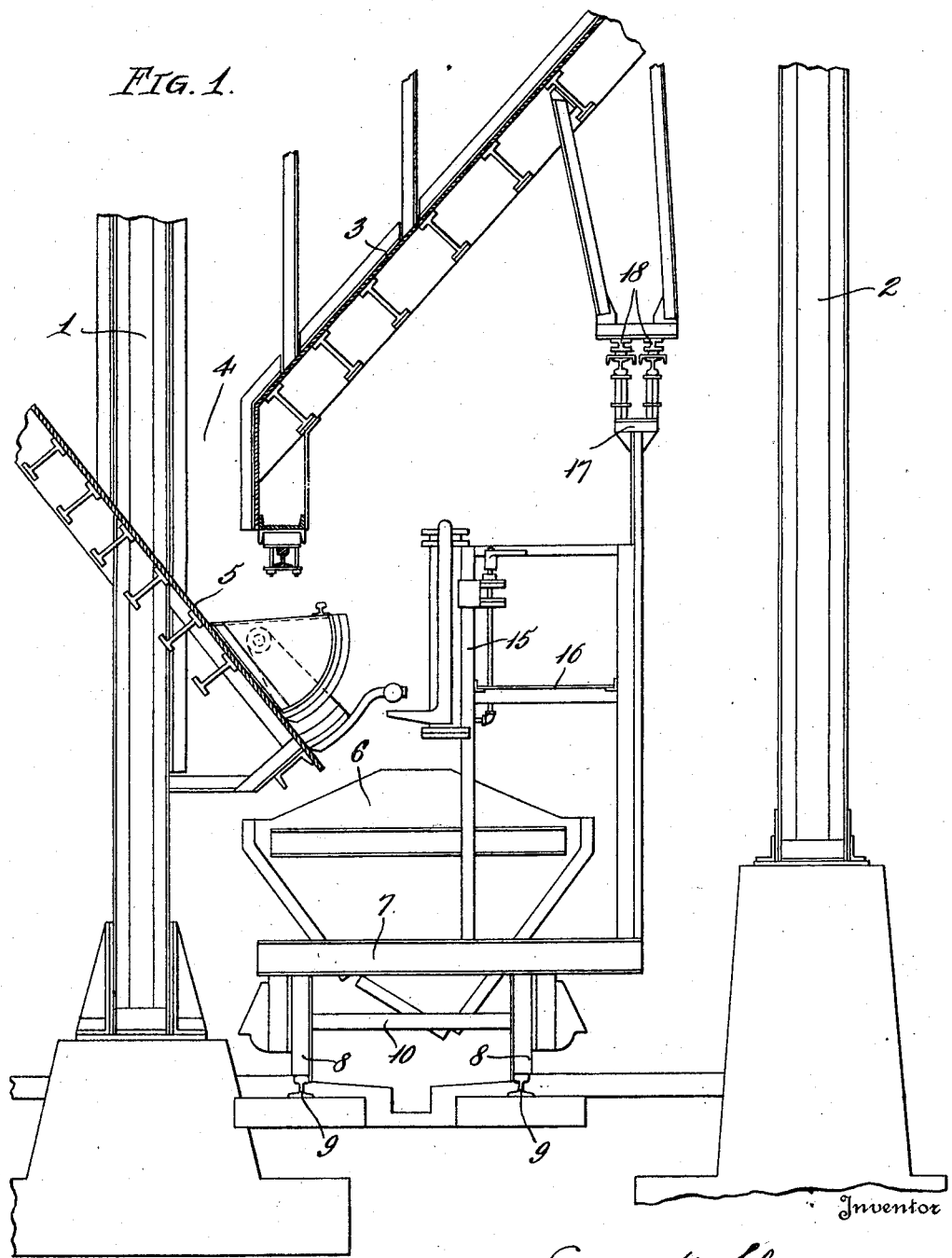
Figure 2:
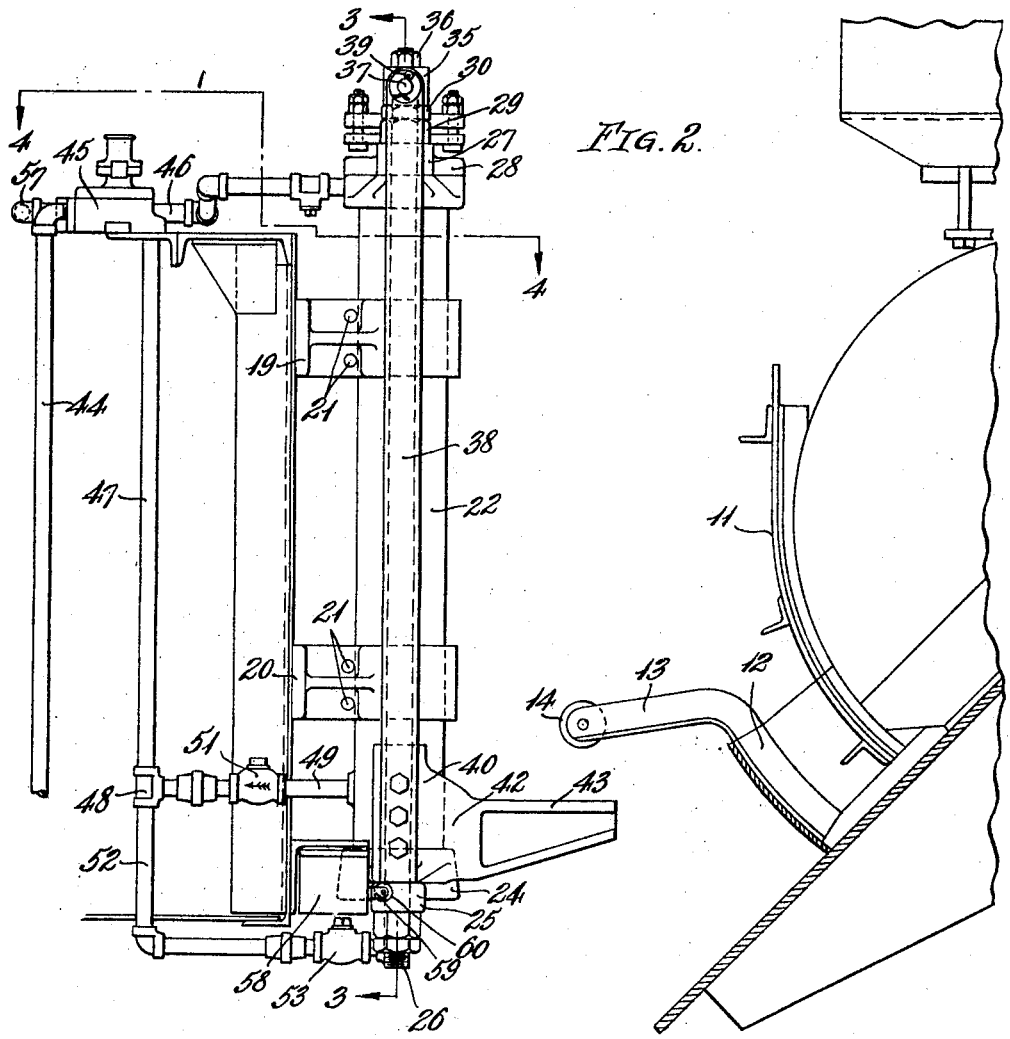
Figure 3:
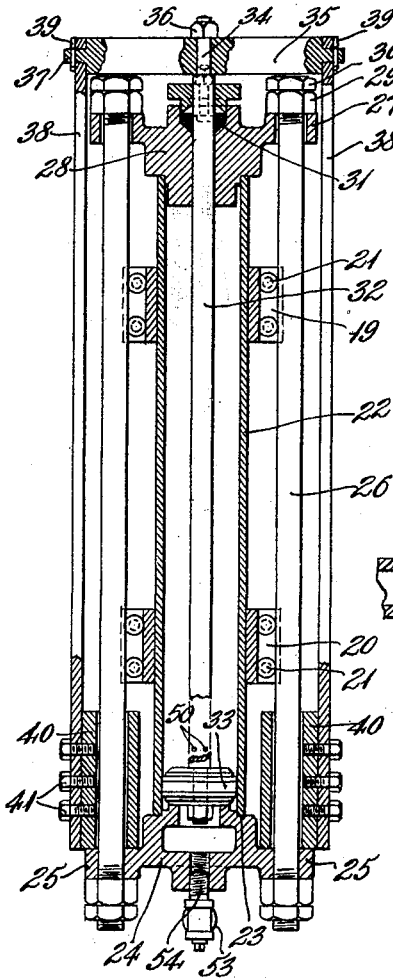
Figure 5:
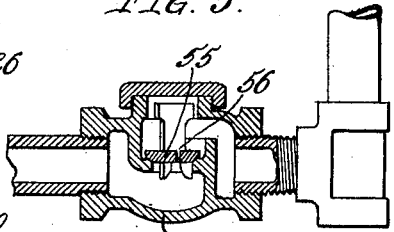
Figure 4:
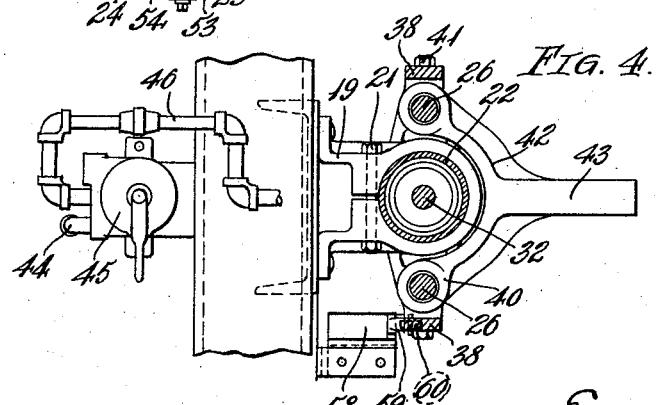
Figure 6:
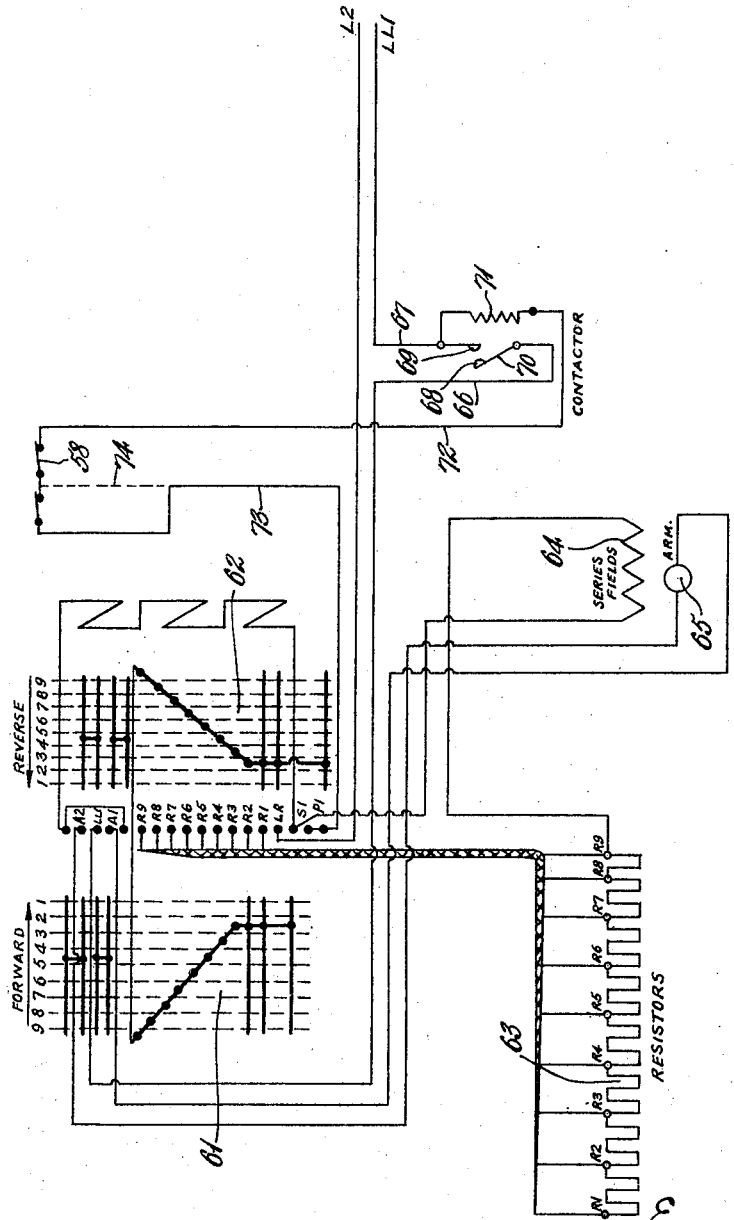

In the arrangement shown in the drawings, Fig. 1 is a view showing an installation; Fig. 2 is an enlarged detail view of the door handling mechanism; Fig. 3 is a vertical sectional view; Fig. 4 is a section upon the line 4—4 of Fig. 2; Fig. 5 is a detail view of the bleed check valve; and Fig. 6 is a schematic diagram showing the control interlocked with the door handling mechanism.

In the embodiment shown in the drawings, the ore or other material chute comprises the walls 1 and 2 supporting an intervening hopper bottom 3 and providing a discharge throat 4 through which the material is discharged against an inclined chute member 5 projecting outward to a point above the container 6 which is supported upon a suitable frame 7 mounted on wheels 8 operating upon tracks 9 arranged between the two walls 1 and 2. The axle 10 carrying the wheels 8 is driven by a motor of any suitable type, not shown. There are a plurality of these bins containing the various materials used in a charge for a furnace for example, and each bin is controlled by a bin door or gate, and each gate comprises a swinging member 11 for checking the main discharge from the chute and an auxiliary gate 12 for checking the final limited discharge, this gate structure being one which is familiar to those skilled in the art. The auxiliary gate 12 is provided with outwardly extending side members 13 which receive a cross bar 14 by means of which the auxiliary gate and main gate are raised by suitable bin gate handling mechanism. Secured to the car or conveyor frame 7 is a suitable framework 15 for supporting the platform 16 for the operator and the bin gate handling mechanism about to be described. The car is also provided with a suitable trolley member generally indicated at 17 and adapted to engage the circuit rails 18 as shown in Fig. 1.

The bin gate operating mechanism comprises upper and lower brackets 19 and 20 in the form of a split ring structure adapted to be clamped by the bolts 21 about the tubular cylinder 22. This tubular cylinder is of tubing adapted at its lower end to seat at the shoulder seat 23 on the lower cylinder head 24. This cylinder head is provided with opposed ears 25 which receives through bolts 26 extending upwardly in parallelism with the cylinder and through corresponding ears 27 projecting diametrically from the upper cylinder head 28. Suitable nuts 29 and 30 on these bolts serve to clamp the two cylinder heads upon the ends of the cylinder. The upper cylinder head is provided with a stuffing box structure indicated at 31 and furnish a packing means for a piston rod 32 which extends into the cylinder and is there provided with a piston having a metallic packing ring 33 in a suitable groove therein. The piston rod 32 at its upper end is reduced at 34 where it passes through a cross head 35 held on the reduced portion by a suitable nut 36. Each outer end of this cross rod is provided with a reduced portion 37 for passage through a suitable opening in the upper end of a side link 38 and held thereon by a suitable cotter pin 39. Each link extends downwardly and is secured to a sleeve guide or slide 40 of a bin gate engaging member, to be described, by suitable bolts or screws 41. The bin gate engaging member comprises the two sleeve guides 40 and a connecting yoke part 42 extending around one side of the cylinder, as shown in Fig. 4. This yoke portion is provided with an outwardly extending lifting lug 43 adapted to project outwardly to a point where it may engage freely under the bar 14 of the auxiliary bin gate.

It is obvious that when pressure is applied below the piston it will rise in the cylinder and lift the bin gate member and raise the gate, and when lowered will return the gate to closed position.

The supply for motor fluid for the cylinder and piston structure thus far described is made up of a supply line or pipe 44 connected to any suitable source of fluid pressure and to an engineer valve 45 or any other suitable control common in the art. This valve is connected by a pipe 46 which leads to the upper cylinder head and communicates with the upper end of the cylinder. Another port of this valve is connected by means of a pipe 47 with a T 48, the side opening of which leads through a pipe 49 to a port 50, Fig. 3, in the side wall of the cylinder at a distance from but near the bottom. This pipe 49 is provided with a check valve 51 which opens freely with the exhaust from the bottom of the cylinder and in the direction indicated by the arrow in Fig. 2. The remaining through connection of the T 48 is connected by a pipe 52 through a check valve, of special construction, to the bottom of the cylinder through the connection 54, as shown in Fig. 3. The check valve 53 is similar in all respects to the well known check valve except that its valve member 55 is provided with a small bleed opening 56 leading from one side of the valve to the other. This valve, as shown in Fig. 5, opens toward the cylinder. In other words, the fluid pressure will raise the valve freely and pass to the cylinder to raise the piston in the cylinder, upon the downward movement of the piston, this check valve blocks the free passage at this point and permits only a slow passage of the fluid pressure through the bleed opening 56. The exhaust from the upper and lower ends of the cylinder are handled by the valve 45 in a well known manner and are delivered to the exhaust pipe 57.

In using the door handling mechanism, the operator shifts the valve mechanism to a position to deliver the fluid pressure to the pipe 47 with the result that it cannot pass the check valve 51 and will be required to pass down and raise the check valve 55 before it reaches the cylinder under the piston. It will perform this operation very readily and will raise the piston in the cylinder to the proper height to fully open the bin gate with which it is cooperating. To close the gate, the operator connects the pipe, or the port in the valve connected to the pipe 47, with the exhaust resulting in the weight of the bin gate causing the piston and the parts connected to it to move downward. The downward movement is very rapid until the piston passes the port 50 when the exhaust is restricted by the small capacity of the bleed 56 in the check valve 53. This small bleed produces such a retarding and cushioning action upon the piston that it is seated very slowly. The ideal arrangement is one where the cushioning effect takes place immediately following the seating or closing of the pin. In cold weather when the oil or other material in the cylinder and piston structure is heavy, it may be necessary to speed up the downward movement of the piston, in which case the operator, by the use of the valve 45, can very readily supply air to the upper side of the piston.

The special form of check with its bleed used to retard the downward movement of the piston very effectively protects the mechanism against damage which might otherwise result from the unrestricted downward movement of the parts on the closing operation.

The construction and arrangement of the parts of this bin gate handling mechanism is such that the entire apparatus may be manufactured and sold at a reasonable cost and when installed is extremely effective in the hands of the average operators.

Another advantageous feature of the foregoing construction of door handling mechanism resides in the arrangement of the smooth tubular cylinder in the supporting clamps, in that these clamps may be loosened and the cylinder adjusted vertically to bring the lifting lug 47 in a critical position with respect to the bin gate bar 14. Heretofore, this has been extremely difficult and required considerable dismantling and manipulation of the parts of the mechanism.

In order to prevent the operator from starting his car from one bin before he has closed the gate, there is an interlock provided between the movable part of the bin gate handling mechanism and the controller circuit and it comprises any form of switch of the normally opening type but closed by any one of the movable parts of the bin gate handling mechanism when it reaches its lowermost position. Such a switch needs no detail description because it may be of any well known type, but is indicated at 58, and is provided with an arm 59 having a roller 60 arranged in the path of the yoke 42 which is a part of the bin gate lifting lug 43.

The connection of this interlocking switch with the controller circuit will be explained in connection with the schematic diagram shown in Fig. 6, wherein the line wires $L^1$ and $L^2$ connected to the trolley lead to a controller of any approved type but containing forward contact circuits generally indicated at 61, the reverse contact circuits being indicated at 62, all connected to the resistance indicated at 63 and to the field winding 64 and armature 65 of the motor. The controller, as stated, is supplied with current by the main line wires $L^1$ and $L^2$ through a maintaining circuit including wires 66 and 67 leading to a maintaining switch including contacts 68 and 69, the former being mounted upon the movable switch arm 70. This arm is under the control of a maintaining switch coil 71 connected to the wire 67 and leading through a wire 72 to the interlocking switch 58 and thence through a wire 73 to the controller where it is connected to the line $L^2$ in all positions of the controller. If there is only one bin gate operating device on the car, then the circuit includes one switch 58 and the wire, indicated in dotted lines in Fig. 6, is employed, but if there are more than one bin gate operating devices on the car, then two switches 58 are utilized, and the wire 74 is not used.

In operation, when the operator raises the gate on one of the bin operating mechanisms on his car, one of the switches 58 is opened with the result that the maintaining circuit for the main line circuit of the propelling motor is open at the contacts 68 and 69 and no operation of the controller will effect movement of the car along the ground. In order to be able to move the car, he must see to it that all of his bin gate operating devices, on the car, are in their lowermost or bin gate closing position which would result in the switches 58 being closed, thereby supplying current to the maintaining circuit which closes the maintaining switch and thereby closes the main line circuit to the motor.

What I claim is:

In a bin gate operating mechanism, a cylinder and piston structure, a bin gate engaging device operated thereby, a support, and clamps carried by said support and engaging said cylinder and adapted to permit vertical adjustment of said cylinder in said support whereby the bin gate operating mechanism may be adjusted to properly actuate the bin gate.

In testimony whereof I hereby affix my signature.

EUGENE W. SCHELLENTRAGER.